US009250765B2

(12) United States Patent
Nicolaou et al.

(10) Patent No.: US 9,250,765 B2
(45) Date of Patent: Feb. 2, 2016

(54) CHANGING ICONS FOR A WEB PAGE

(75) Inventors: Alexander Nicolaou, Waterloo (CA);
Brett R. Lider, San Francisco, CA (US);
Ilia Tulchinsky, Maple (CA); Keith A. Stanger, Waterloo (CA); Istiaque Ahmed, Kitchener (CA)

(73) Assignee: Google Inc., Mountain View, CA (US)

( * ) Notice: Subject to any disclaimer, the term of this patent is extended or adjusted under 35 U.S.C. 154(b) by 1064 days.

(21) Appl. No.: 13/345,099

(22) Filed: Jan. 6, 2012

(65) Prior Publication Data
US 2015/0193117 A1    Jul. 9, 2015

Related U.S. Application Data

(60) Provisional application No. 61/440,848, filed on Feb. 8, 2011.

(51) Int. Cl.
*G06F 17/22* (2006.01)
*G06F 3/0481* (2013.01)
*G06F 17/30* (2006.01)

(52) U.S. Cl.
CPC ...... *G06F 3/04817* (2013.01); *G06F 17/30884* (2013.01)

(58) Field of Classification Search
CPC ............ G06F 17/2235; G06F 17/2241; G06F 17/2247; G06F 17/30905; G06F 17/30884; G06F 17/30899; G06F 3/04817
See application file for complete search history.

(56) References Cited

U.S. PATENT DOCUMENTS

| | | | | |
|---|---|---|---|---|
| 7,499,989 | B2 * | 3/2009 | Amadio et al. | 709/222 |
| 7,555,564 | B2 * | 6/2009 | Gimson et al. | 709/245 |
| 2003/0030679 | A1 * | 2/2003 | Jain | 345/854 |
| 2003/0095139 | A1 | 5/2003 | Davidsson | |
| 2003/0184582 | A1 | 10/2003 | Cohen | |
| 2004/0205543 | A1 * | 10/2004 | Awada et al. | 715/512 |
| 2007/0250920 | A1 * | 10/2007 | Lindsay | 726/7 |
| 2009/0300511 | A1 | 12/2009 | Behar et al. | |
| 2009/0313579 | A1 * | 12/2009 | Poulson | 715/809 |
| 2010/0083158 | A1 | 4/2010 | Adler et al. | |
| 2011/0055314 | A1 * | 3/2011 | Rosenstein et al. | 709/203 |

OTHER PUBLICATIONS

'Ajax Magazine' [online] "Dynamic Favicons," 2006, [retrieved on Jan. 6, 2012]. Retrieved from the Internet: URL: < http://ajax.phpmagazine.net/2006/03/dynamic_favicons.html.> 3 pages.

(Continued)

*Primary Examiner* — Wilson Tsui
(74) *Attorney, Agent, or Firm* — Fish & Richardson P.C.

(57) ABSTRACT

In general, the subject matter described in this disclosure can be embodied in methods, systems, and program products for changing a reference to a bookmark icon. The method includes receiving resources that include an HTML document and computer program script code. The HTML document does not include a reference to a bookmark icon. The method includes determining that the computing device has loaded the web page and, in response, adding, in a representation of the HTML document, a reference to a first bookmark icon. The method includes receiving a request to change a display of the web page from a first screen to a second screen, without requesting additional resources over the network. The method includes removing the reference to the first bookmark icon in the representation of the web page, and adding a reference to a second bookmark icon in the representation of the web page.

20 Claims, 5 Drawing Sheets

(56) References Cited

OTHER PUBLICATIONS

'Android developers' [online] "App Widgets," 2012, [retrieved on Jan. 6, 2012]. Retrieved from the Internet: URL: < http://developer.android.com/guide/topics/appwidgets/index.html.> 17 pages.

'Neuro Productions' [online]. "Dynamic Flash Generated Favicon," 2009, [retrieved on Jan. 6, 2012]. Retrieved from the Internet: URL: <http://www.neuroproductions.be/experiments/dynamic-flash-generated-favicon/.> 4 pages.

'NuclearScripts' [online] "Dynamic favicon," 2007, [retrieved on Jan. 6, 2012]. Retrieved from the Internet: URL: < http://nuclearscripts.com/javascript/scripts-and-programs/visual-effects/dynamic-favicon.html>. 2 pages.

'O'reilly Answers' [online] "How to Create a Website Icon for the iPhone and other Mobile Devices," 2010, [retrieved on Jan. 6, 2012]. Retrieved from the Internet: URL:<http://answers.oreilly.com/topic/2123-how-to-create-a-website-icon-for-the-iphone-and-other-mobile-devices/>. 3 pages.

'Remysharp' [online] "Dynamic favicons," 2010, [retrieved on Jan. 6, 2012]. Retrieved from the Internet: URL: <http://remysharp.com/2010/08/24/dynamic-favicons/.> 6 pages.

'Software as She's Developed' [online]. "Dynamic Favicons," 2006, [retrieved on Jan. 6, 2012]. Retrieved from the Internet: URL:<http://softwareas.com/dynamic-favicons.> 8 pages.

'Stackoverflow' [online] "Android App activities installed as multiple icons," 2010, [retrieved on Jan. 6, 2012]. Retrieved from the Internet: URL:< http://stackoverflow.com/questions/3527263/android-app-actvities-installed-as-multiple-icons>. 2 pages.

'Stackoverflow' [online] "How do I get multiple icons to launch different activities in one application?," 2010, [retrieved on Jan. 6, 2012]. Retrieved from the Internet: URL:<http://stackoverflow.com/questions/3270409/how-do-i-get-multiple-icons-to-launch-different-activities-in-one-application>. 2 pages.

Trautschold and Mazo. 'Googlebooks' [online]. "Chapter 17—Surfing the Web with Safari" in: *iPhone 4 Made Simple*, 2010, [retrieved on Jan. 6, 2012]. Retrieved from the Internet: URL: < http://books.google.com/books?id=1QxSC1dL3YMC&1pg=PA444&ots=F-T7xAfPng&dq=iphone%20%22web%20page%20icon%22&pg=PA444#v=onepage&q=iphone%20%22web%20page%20icon%22&f=false.> pp. 444-445.

Webtoolkit' [online]. "Dynamic favicon," 2012, [retrieved on Jan. 6, 2012]. Retrieved from the Internet: URL: < http://www.webtoolkit.info/dynamic-favicon.html>. 5 pages.

\* cited by examiner

CHANGING ICONS FOR A WEB PAGE

CROSS-REFERENCE TO RELATED APPLICATION

This application claims priority to U.S. Provisional Application Ser. No. 61/440,848, filed on Feb. 8, 2011, entitled "Changing Icons for a Web Page," the entire contents of which are hereby incorporated by reference.

TECHNICAL FIELD

This document generally relates to web pages.

BACKGROUND

Some computing devices include web browser application programs that enable users of the devices to request and view web pages. A user may request that the web browser display a web page, for example, by typing the Uniform Resource Locator (URL) for that web page into an address bar of the web browser. The web browser may request, over the internet, resources that correspond to the URL. A server system may receive the request and return a set of resources to the computing device. The set of resources can include a HyperText Markup Language (HTML) document and a JavaScript document.

The web browser may process the resources and display a web page based on the content of the resources. Some of the links in the web page, when selected by the user, may prompt the web browser to request resources for different web pages. Other of the links in the web page, however, may cause the web browser to present a different "screen" of the web page to the user. This different screen may be generated based on instructions in the same set of resources and without requesting further resources over the internet.

The screens of a web page may be designated by different hash fragments in the URL address for the web page. For example, the address bar of the web browser may display the URL www.examplesite.com/#first_screen for a first screen of a web page that is displayed to a user, and may display the URL www.examplesite.com/#second_screen for a second screen of the web page. The hash fragment portion of the URL may be used solely for client-side processing and navigation, and may not be transmitted in requests, over the internet, for web page resources.

Some web browsers allow users to bookmark web pages, for example, by selecting a "Bookmark" interface element. Upon selecting the bookmark interface element, the web browser may determine if the displayed web page includes markup code that references a bookmark icon. A bookmark icon is an image that is displayed as at least a portion of a visual representation of the bookmark (e.g., an icon that is displayed on the desktop of a mobile device). A bookmark may designate a target network address. A target network address may be a URL that was located in a network address field of a web browser at a time that the bookmark was created.

The bookmark may designate a target network address that includes a hash fragment that designates a particular screen of a web page. Thus, when a user selects the bookmark, the web browser may request resources that are designated by a base portion of the URL, where the base portion of the URL is a portion of the URL that precedes the hash symbol in the URL. The computing device may receive resources that correspond to the base portion of the URL, and may generate an internal representation of the web page based on the received resources.

Before the web browser generates a display of the web page, and after it forms a basic representation of the web page, the web browser may execute scripting code that is included in the received resources. The scripting code may extract the hash fragment from the network address field, and may restructure the representation of the webpage so that the web page that will be displayed shows the web page screen that corresponds to the hash fragment. The web browser may restructure the representation of the web page without requesting additional resources over the network.

Thus, a user may create multiple bookmarks for the same set of resources, for example, bookmarks for different screens that can be generated using the same set of resources. The resources may reference a single bookmark icon. Thus, bookmarks for different screens of the web page may use the same bookmark icon.

SUMMARY

This document describes techniques, methods, systems, and mechanisms for changing an icon for a web page. In general, a web page that is configured to display multiple different screens can include a script that updates, as the screens change, a reference to an icon. Thus, when a user bookmarks the web page, a representation of the web page that is stored by the web browser designates an icon that corresponds to the presently displayed screen. As such, the bookmark that is generated may include an icon that is unique to the screen that is designated by the bookmark.

In general, one aspect of the subject matter described in this disclosure can be embodied in a computer-implemented method for changing a reference to a bookmark icon. The method includes requesting, by a computing device and over a network, resources that correspond to a first network address. The method includes receiving, by the computing device and from a server system, the resources, wherein the resources include an HTML document and computer program script code, and wherein the HTML document does not include a reference to a bookmark icon that causes a web browser, upon receiving a request to bookmark a web page generated from the HTML document, to generate a bookmark that uses the bookmark icon in a visual appearance of the bookmark. The method includes processing, by the computing device, the resources to load the web page. The method includes determining, by the computing device, that the computing device has loaded the web page and, in response, adding, in a representation of the HTML document, a reference to a first bookmark icon. The method includes receiving, by the computing device, a request to change a display of the web page from a first screen to a second screen, wherein changing the display of the web page from the first screen to the second screen is performed without requesting additional resources over the network. The method includes removing, by the computing device and in response to receiving the request to change the display, the reference to the first bookmark icon in the representation of the web page, and adding, in response to receiving the request to change the display, a reference to a second bookmark icon in the representation of the web page.

Additional aspects can optionally include one or more of the following features. The method can include receiving, by the computing device, a request to bookmark the web page and, in response, (i) identifying, in the representation of the HTML file, the reference to the second bookmark icon, and (ii) identifying an address for the second screen of the web page, wherein the address for the second screen of the web page includes the first network address. The method can include generating, by the computing device, a generated bookmark that: (iii) uses the second bookmark icon in a visual display of the generated bookmark, and (iv) designates the address for the second screen of the web page. The computing device may not display the first bookmark icon before the computing device receives the request to bookmark the web page, and does not display the second bookmark icon before the computing device receives the request to bookmark the web page.

The method can include displaying, by the computing device and accompanying the display of the first screen, a first website icon, wherein the first website icon is different than the first bookmark icon. The method can include displaying, by the computing device and accompanying the display of the second screen, a second website icon, wherein the second website icon is different than the second bookmark icon. The first website icon may be displayed by the computing device in close proximity to an address bar that displays the first network address for the first screen.

The method can include requesting, by the computing device and over the network, the second bookmark icon in response to identifying the reference to the second bookmark. The address for the second screen of the web page may include the first network address and a second hash fragment, and wherein the address for the first screen of the web page may include the first network address and a first hash fragment. The computer program script code that is received from the server system may include code that causes a web browser at the computing device to perform: (i) the adding the reference to the first bookmark icon, (ii) the removing the reference to the first bookmark icon, and (iii) the adding the reference to the second bookmark icon. The reference to the first bookmark icon may be included within a "<link>" tag, and wherein the reference to the second bookmark icon may be included within a "<link>" tag. Neither of the first bookmark icon and the second bookmark icon may be named any of "apple-touch-icon.png" or "apple-touch-icon-precomposed.png". The "<link>" tag may includes a rel attribute that specifies that the link tag designates a bookmark icon. The rel attribute may specifies "apple-touch-icon" as a value.

Another aspect of the subject matter described in this specification can be embodied in a computer-readable storage device storing a computer scripting program, that when executed by a web browser application program that is executing by a processor. The operations include adding, after the web browser determines that a web page that is generated using an HTML file has been loaded by the web browser, a reference to a first bookmark icon in a representation of the HTML file. The operations include determining that user input, to change a display of the web page from a first screen to a second screen without requesting additional resources over a network, has been received. The operations include removing, in response to determining that the user input has been received, the reference in the representation of the HTML file to the first bookmark icon. The operations include adding, in response to determining that the user input has been received, a reference in the representation of the HTML file to a second bookmark icon.

Additional aspects can optionally include one or more of the following features. The representation of the HTML file may not include any reference to a bookmark icon before the reference to the first bookmark icon was added in the representation of the HTML file.

Another aspect of the subject matter described in this specification can be embodied in a computerized system. The system includes a web page requester, at a computing device, to receive a user-initiated request for a web page and, in response, to request resources that correspond to the web page over a network. The system includes a web page loader, at the computing device, to receive the resources over the network and from a server system, and to load the web page using the resources. The system includes a screen change determiner, at the computing device, to determine that a user has requested a change from a display of a current screen of the web page to a display of a new screen of the web page, wherein the current screen and the new screen can be generated by the web page loader using the resources without the web page requester requesting additional resources over the network. The system includes an icon changer, at the computing device, to: modify a data structure that is generated from the resources to: (i) add to the data structure a designation of an icon that corresponds to the current screen if the data structure does not include any designation of an icon that is used in a visual representation of a bookmark when the current screen is bookmarked, and (ii) add in the data structure a designation of an icon that corresponds to the new screen in response to the screen change determiner determining that the user requested the change to the display of the new screen.

Additional aspects can optionally include one or more of the following features. Adding the designation of the icon that corresponds to the new screen can include overwriting the designation of the icon that corresponds to the current screen. The web page loader may determine that the user has requested a change from the display of the current screen to the new screen includes periodically determining whether a network address of the web page has changed. Determining whether the network address has changed may include determining that a hash fragment in the network address has changed. The web page loader, in response to determining that the user has requested a change from the display of the current screen to the new screen, may further change the display of the web page from the current screen to the new screen. The web page loader, in response to determining that the user has requested a change from the display of the current screen to the new screen, may change content of a network address of the web page by changing a hash fragment portion of the network address and not changing a remaining portion of the network address.

Particular embodiments can be implemented, in certain instances, to realize one or more of the following advantages. The use of different bookmark icons for different screens of a web page allows a user of a computing device to more quickly select a bookmark from a displayed collection of bookmarks. The user may be less confused which bookmark from the displayed collection represents a particular screen of a web page, and may be able to select a desired bookmark without reading text that accompanies the bookmarks in the displayed collection. Developers of web pages may also be more likely to use a same set of resources to render multiple different screens for a web page. As a result, web users may navigate more quickly between different features of each web page, and may use less network bandwidth.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes changing an icon for a web page. In general, a user may bookmark separate "screens" of a web page that are generated from a single set of web resources (e.g., an HTML file, JavaScript code, etc.). The content of the web page may be updated as the screens change so that, when the web page is bookmarked, the content references an icon that corresponds to the present screen, and so that the bookmark that is generated displays the icon that corresponds to the present screen. Accordingly, a user may bookmark each of the "screens" separately, and each of the bookmarks may have different icons.

Figure 1:
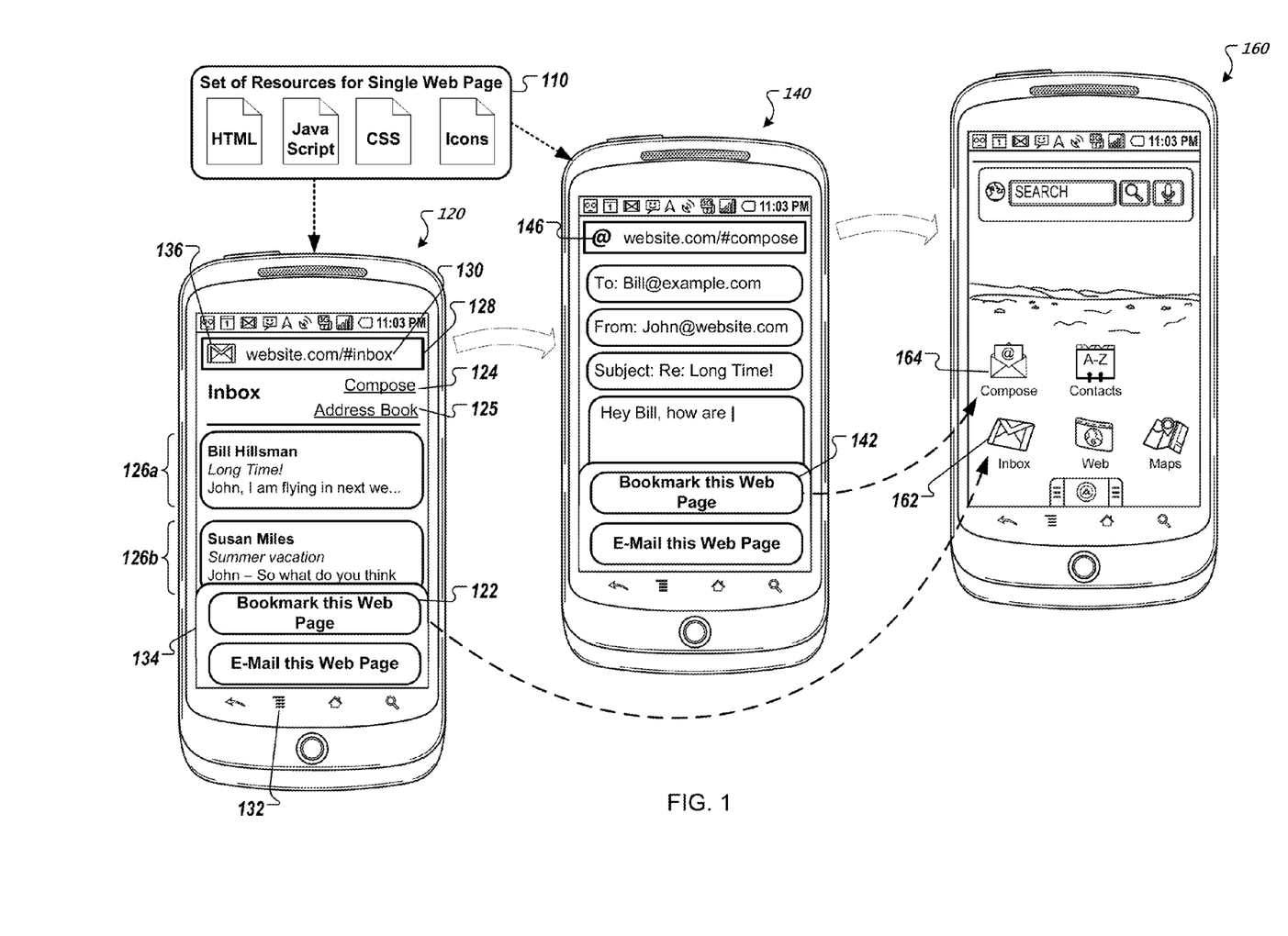
FIG. 1 shows a conceptual illustration of a user bookmarking multiple screens of a web page.

FIG. 1 shows a conceptual illustration of a user bookmarking multiple screens of a web page. In this illustration, a user has requested that a mobile device download resources 110 for a web page. A browser on the mobile device displays a first screen 120 of the web page. The user selects the bookmark interface element 122 to prompt the mobile device to generate a bookmark 162 on the desktop of the mobile device. The user then selects the "Compose" link 124 to navigate to a second screen 140 of the same web page. The user selects the bookmark interface element 142 to prompt the mobile device to generate a bookmark 164 on the desktop of the mobile device. The bookmarks 162 and 164 reference different screens of the same web page, and display different bookmark icons.

In greater detail, a user of a mobile device can request that the mobile device display a web page for the network address "website.com" (e.g., either by selecting a link to the web page, typing a URL for the web page into an address bar of a web browser, or selecting a bookmark to the web page). The mobile device may request a set of resources for the web page over the internet (e.g., as a single request, or as a series of requests that includes a first request for an HTML page and a second request for a JavaScript document in response to identifying a reference to the JavaScript document in a header of the HTML page). A server system that is remote from the mobile device may receive the request and may return, to the mobile device, a set of resources 110 that the mobile device can use to generate a display of the web page.

The set of resources can include, for example: (i) an HTML file or an xHTML file (both herein referenced as an HTML file), (ii) computer program script code (e.g., JavaScript code that is contained in a file that is separate from the HTML file, or that is contained in a header portion of the HTML file), (iii) a Cascading Style Sheet (CSS), (iv) bookmark icons, (v) favicons, (vi) images, and (vii) video files.

A web browser application program that is executing on the mobile device may receive the set of resources 110, and may render a web page using the set of resources 110. For example, the web browser may load the web page by parsing an HTML document and creating a document object model (DOM) data structure that represents the web page. Loading the web page may include incorporating, into the DOM, content from the HTML document, a JavaScript file that is referenced in the HTML document, and a CSS file that is also referenced in the HTML document. Upon the web browser loading the web page, the web browser may generate an "onload" event. As discussed in more detail later, JavaScript code may execute upon receiving an indication of the onload event, and may modify the representation of the HTML document (e.g., by modifying a portion of the DOM that corresponds to a header of the HTML document).

An example web page that is rendered after the occurrence of the onload event is shown as the first screen 120. The first screen 120 displays an inbox for a webmail web application. The first screen 120 displays two messages 126a and 126b that have been received for a user of the mobile device. The first screen 120 also displays links 124 and 125 to different screens of the web application. In this example, the address bar 128 displays the network address 130 "website.com/#inbox" for the first screen 130.

The network address 130 includes multiple portions. A domain portion "website.com" designates a group of servers on the network that provided the resources 110. As illustrated, the network address 130 does not include a path portion, however, such a network address may include a path portion. For example, in the network address "website.com/email_client#inbox.com", the text "email_client" is a path portion. The path portion designates the resources at the group of servers that correspond to the requested resources. A hash fragment portion of the network address 130 is at least part of the "#inbox" portion.

A hash fragment may be a portion of a network address that follows a hash mark in the network address (and may include the hash mark, in some examples). A hash fragment may be used solely for client-side navigation by a web browser. In other words, a hash fragment portion of a network address may not be transmitted to a server system in a request, by a web browser, for web page resources that correspond to the network address. The web browser, upon receiving a request to retrieve resources for a network address that includes a hash fragment, may truncate the hash fragment from the network address. This document refers to a hash fragment as a portion of a network address and a URL. As the hash fragment is not transmitted in requests, over the internet, for web page resources, it may not be technically be considered as part of the URL. This document, however, often refers to the URL as it is seen by the client device, including the hash fragment. This described network address can include a hash fragment.

The hash fragment may allow the web page to designate different client-side "screens" of a web-page. For example, the JavaScript (or other scripting code) for a web page may include instructions that, when executed, restructure the visual display of the web page in response to occurrence of certain events (e.g., selection of a link or expiration of a timer). Each restructured visual display may be designated a "screen," a "view," or a "state" of the web page. Web pages that include multiple different "screens" are sometimes referred to as "web applications."

In the illustration of FIG. 1, a first screen 120 shows the inbox of a webmail web application. Upon the user of the mobile device selecting the compose link 124, the web page may change from the first screen 120 to the second screen 140. The second screen 140 may show a user interface for composing an email message. The web application may include multiple other screens, for example upon selection of the address book link 125, a screen that shows a user interface of an address book.

Both the first screen 120 and the second screen 140 may be generated from the same set of resources 110. For example, the compose link 124 may designate, as a target of the link, the network address "website.com/#compose." Accordingly, upon selection of the link, the web browser may change the displayed network address 130 from "website.com/#inbox" to "website.com/#compose." In some examples, the web browser also changes an internally stored network address that is not displayed to the user and is not editable by the user.

The JavaScript code may periodically check the network address (e.g., the network address 130 or the network address in the internally stored network address) to determine whether the network address has changed. If the JavaScript determines that a hash fragment portion of the network address has changed, the JavaScript code may identify whether a "screen" corresponds to the new hash fragment, and if so, may execute instructions from the set of resources 110 to modify the internal representation of the web page so as to generate a display of the new screen. The web browser may avoid requesting additional resources over the network (or from a cache) in order to generate the display of the second screen.

A user may bookmark the first screen 120. For example, while the mobile device is displaying the first screen 120, the user may select the menu button 132, which may cause the menu 134 to display on the mobile device. The menu 134 includes a "Bookmark this Web Page" interface element 122 that, when selected, invokes the web browser or mobile device to generate a bookmark to the first screen of the web page. In this illustration, selection of the bookmark interface element 122 invokes creation of a bookmark 162 on the desktop of the mobile device. In some examples, selection of the bookmark interface element 122 invokes creation of a bookmark that is displayed to a user upon selecting a "display bookmarks" interface element within a web browser application program.

Upon user selection of the interface element 122, the web browser may generate the bookmark 162 by identifying the network address for the present screen of the web page (e.g., a network address that is stored in the internally stored network address or that is displayed in the address bar 128). Also upon selection of the interface element 122, the web browser may determine if the web page references a bookmark icon for use in a visual representation of the bookmark 162, and if so, may use the referenced bookmark icon. Accordingly, the bookmark 162 may display the referenced bookmark icon and may, when selected by a user, cause the web browser to generate a display the first screen 120. Similarly, a user may bookmark the second screen 140 in order to generate the bookmark 164.

The bookmarks 162 and 164 reference different screens of the same web page, but show different bookmark icons. As described in more detail below, in some examples, a web browser may be configured to support a single reference to a single bookmark icon for multiple screens of a web page. Thus, in order to generate multiple bookmarks with different bookmark icons for the multiple screens, the web page may include script that modifies the single reference to the single bookmark icon to reference different bookmark icons during different periods of time.

As a further example of web page navigation using hash fragments, suppose that the mobile device is displaying the desktop screen 160 and the user selects the "Compose" bookmark 164. The mobile device may launch the web browser and request that the web browser navigate to the URL "website.com/#compose." The web browser may truncate the hash fragment from the URL and request resources, over the internet, from for the network address "website.com." The web browser may receive the resources and load the web page, all the while storing the originally requested URL "website.com/#compose" in the network address field.

Upon the web page being loaded, the JavaScript in the web page may execute and may check the internally stored network address to determine if a present representation of the web page corresponds to the hash fragment in the URL. The JavaScript code may determine that the hash fragment indicates that the JavaScript should change the display of the web page to the "compose" screen, and accordingly may modify the representation of the web page so that, when the web page is displayed, the second screen 140 is shown to a user.

In this illustration, the address bar 128 in the first screen 120 displays a network address with the hash fragment "#inbox" even though the first screen 120 may have been displayed in response to a user typing the network address "website.com" without any hash fragment. The hash fragment may be inserted into the network address either as a result of a redirect by a server system, or as a result of the script code updating the internally stored network address and the address bar 128 to display a hash fragment that designates a default screen of the web page.

In some examples, the web browser displays favicons 136 and 146 during the displays of the first screen 120 and the second screen 140, respectively. A favicon is an icon that corresponds to a particular web page or web pages, and is typically displayed in proximity to the address bar 128 of a web browser. A displayed location of a favicon (e.g., next to the address bar 128) in a user interface of the web browser may be controlled by the web browser and not controlled by the set of resources 110. On the other hand, images that are displayed as part of a web page may be controlled, at least in part, by the content of the set of resources 110. In some examples, the scripting code updates the favicon so that each screen of the website is designated with a different favicon. In some examples, the favicon is updated in response to the same event as the bookmark icon (e.g., the hash fragment in the network address changing). Each screen of a web page may be associated with its own favicon from a group of multiple favicons and its own bookmark icon from a group of multiple bookmark icons.

The favicon and the bookmark icon for a specific screen may be different. For example, a favicon and a corresponding bookmark icon may display different images (e.g., as illustrated in FIG. 1). A favicon may be smaller and of lower resolution than a bookmark icon. Also, an HTML document that is received from a server system may reference a favicon in a "<link>" tag of the HTML document. A bookmark icon, in some examples, not may be referenced in the HTML document until after the HTML document is loaded. If the HTML document includes an initial reference to a bookmark icon and JavaScript later requests a change in the bookmark icon, the web browser may not display the bookmark icon that is referenced in the most-recent version of the HTML document.

In some examples, a device may not display favicons, but may display bookmark icons. In some examples, a favicon is downloaded and displayed by a web browser in response to an indication of the favicon in the representation of the HTML page being changed. A bookmark icon, on the other hand, may not be displayed and may not be downloaded over the network until the web browser receives an indication that a user would like to bookmark a present web page.

Figure 2:
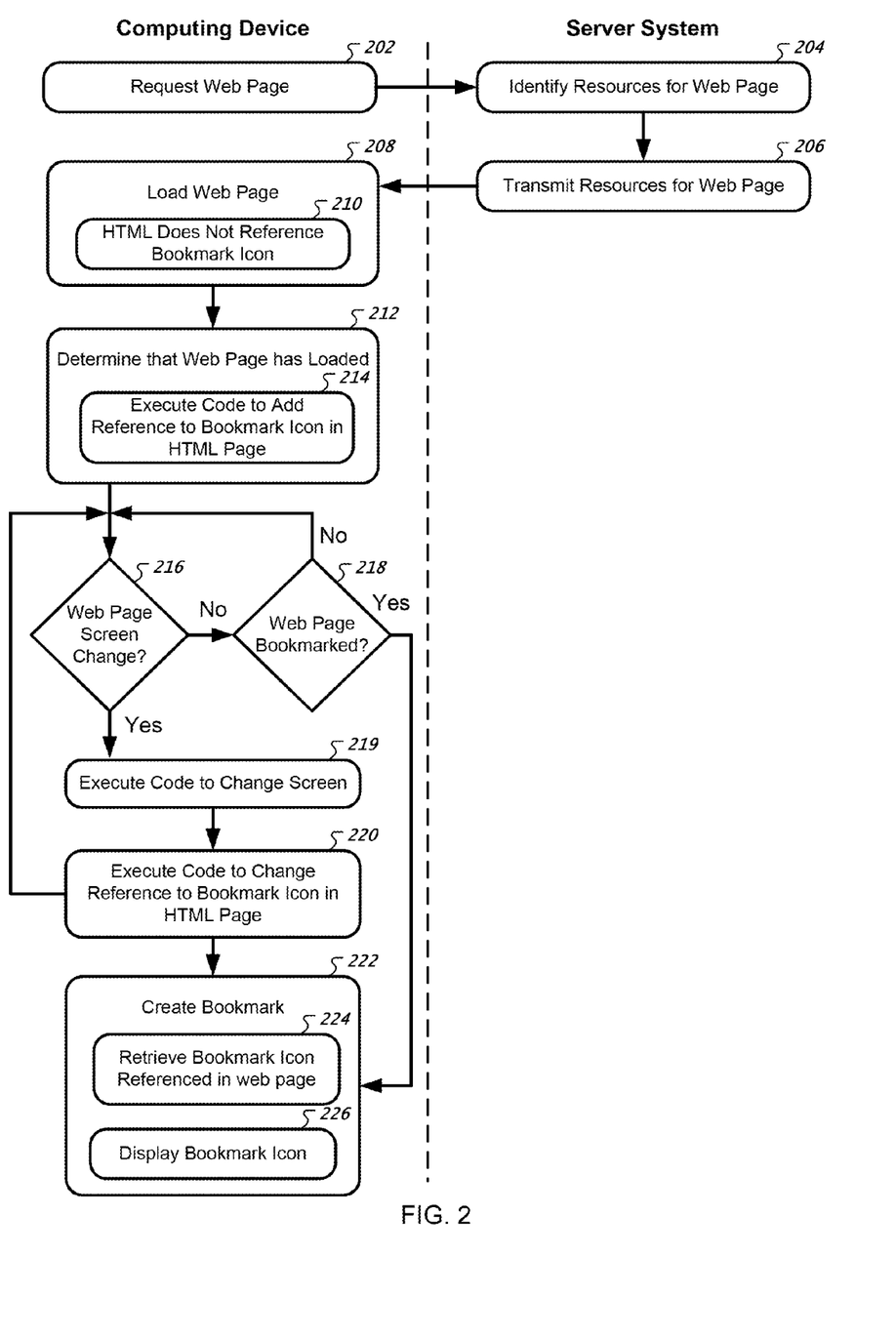
FIG. 2 shows a flowchart of an example process for changing an icon for a web page.

FIG. 2 shows a flowchart of an example process for changing an icon for a web page. In box 202, the computing device requests a web page. For example, the computing device may receive user selection of a link that designates a network address. The computing device may request resources that correspond to the network address over the internet.

In box 204, the server system receives the request and identifies resources for the web page. For example, internet routing devices may route the request to the server system, the server system may identify a path in the network address of the request, and the server system may identify resources that correspond to the path.

In box 206, the server system returns the identified resources.

In box 208, the computing device loads the web page. For example, the computing device may parse the HTML document (and at least some of the documents that are referenced by the HTML document) to generate a DOM representation of the web page. Upon the web page being loaded (e.g., upon generation of the DOM), the web browser may issue a page "load" event. In some examples, the HTML document that is received does not include a reference to a bookmark icon (box 210). In some examples, a bookmark icon is an icon that is designated within a <link> tag. In some examples, the link tag includes a "rel='apple-touch-icon'" attribute.

In box 212, the mobile device determines that the web page has completed loading. For example, the JavaScript code in the resources for the web page may include an event handler that detects occurrence of the window.load event. As shown later with reference to box 220, the JavaScript may include a "wireless.util.startup.execPostLoad( )" function call. The function call may execute code that adds, to representation of the HTML page (e.g., the DOM or the HTML document) a reference to a bookmark icon that corresponds to a first screen of the web page.

In box 216, the mobile device determines if the screen of the web page has changed. For example, the web page may be configured so that the network address updates upon the web browser receiving an indication that the screen should change (e.g., upon selection of a link to another screen). For example, selection of the "Compose" link 124 may cause a change in both the network address (e.g., both displayed and internally stored).

The JavaScript may include code that periodically checks the network address (e.g., every N milliseconds upon expiration of a timer) to determine if a hash fragment portion of the network address has changed to a hash fragment that designates a different screen of the web page. If the hash fragment has not changed, the JavaScript may perform the determination of box 218 (as discussed below). If the hash fragment has changed, the operations of box 219 are performed.

In box 219, the computing device executes code to change the web page screen. For example, the JavaScript may extract the hash fragment, identify a set of operations that correspond to the hash fragment, and execute the identified set of operations. The executed operations may change a visual display of the web page (e.g., by removing and adding graphical interface elements from the display).

In box 220, the computing device executes code to change a reference to a bookmark icon in the HTML page (e.g., the DOM or the HTML document). An example of code that changes the reference to the bookmark icon (and adds an initial reference to the bookmark icon upon the web page loading), is shown below.

Function for setting the href of a bookmark icon link tag upon an optional delay.

```
wireless.util.bookmarkicon.setOrCreateBoomarkIconLink = function(rel,
url, opt_document, opt_dontDelayTillWindowLoaded) {
    if (!opt_dontDelayTillWindowLoaded) {
        wireless.util.startup.execPostLoad(
            goog.partial(wireless.util.links.setOrCreate,
                rel, url, opt_document));
    } else {
        wireless.util.links.setOrCreate(rel, url, opt_document);
    }
};
```

This function sets the href of a bookmark icon link tag in a web page (e.g., in the DOM representation of the HTML document) or creates a new bookmark icon link tag if the link tag does not already exist in the web page. This function may delay setting the icon until the window.load( ) function is called. The "rel" variable designates the rel attribute of the link tag that is to be set. The web browser may look for a <link> tag with a specific rel attribute that designates a bookmark icon when a request is received to bookmark a web page. The "url" variable designates the href of the link tag that is to be set. The "opt_document" variable designates the document to operate on, and defaults to the current window's document. The "opt-dontDelayTillWindowLoaded" defaults to false and, if false, may delay setting the link tag until the window.load( ) function is called.

In some implementations, setting the link tag is delayed because the IOS operating system and web browser changes an icon of an originating bookmark if a user reloads the web page in the browser and the new page that is being reloaded sets the icon before the "onload( )" event. If the code delays adding the reference to the bookmark icon to the web page, along with not calling any iFrame loads or xhrs calls before the window.load( ) event, the web page code may be able to update the bookmark icon without resetting existing bookmarks.

Function for setting the href of a link tag or creating a new link tag if a link tag does not already exist.

```
wireless.util.links.setOrCreate = function(rel, url, opt_document) {
    var link = wireless.util.links.get(rel, opt_document);
    if (link) {
        link.setAttribute('href', url);
    } else {
        // Create the new link tag if it doesn't yet exist.
        wireless.util.links.create(rel, url, opt_document);
    }
};
```

Function for getting the requested link tag if the requested link tag exists.

```
wireless.util.links.get = function(rel, opt_document) {
    rel = rel.toLowerCase( );
    var doc = opt_document || document;
    var links = doc.getElementsByTagName('link');
    for (var i = 0; i < links.length; ++i) {
        var currLink = /** @type {Element} */ (links[i]);
        if (currLink.getAttribute('rel').toLowerCase( ) == rel) {
            return currLink;
        }
    }
    return null;
};
```

Function for creating a new link in the HEAD element. This function assumes the existence of the HEAD element.

```
wireless.util.links.create = function(rel, url, opt_document) {
    var doc = opt_document || document;
    var link = doc.createElement('link');
    link.setAttribute('rel', rel);
    link.setAttribute('href', url);
    var head = /** @type {Element} */
    (doc.getElementsByTagName('head')[0]);
    head.appendChild(link);
};
```

Function for removing the specified link tag from the document.

```
wireless.util.links.remove = function(rel, opt_document) {
    var link = wireless.util.links.get(rel, opt_document);
    if (link) {
        link.parentNode.removeChild(link);
    }
};
```

Example rel attribute Icon Designations for IPHONE implementations.

```
/** The link for an iPhone home screen icon with gloss. */
wireless.util.links.REL_APPLE = 'apple-touch-icon';
/** The link for an iPhone home screen icon without the gloss. */
wireless.util.links.REL_APPLE_NO_GLOSS =
'apple-touch-icon-precomposed';
/** The standard link for the favicon. */
wireless.util.links.REL_FAVICON = 'shortcut icon';
```

As an overview, the setOrCreateBoomarkIconLink( ) function includes a wireless.util.startup.execPostLoad( ) function that calls the setOrCreate( ) function after the web browser loads the web page. The setOrCreate( ) function attempts to get a link tag that includes the designated "rel" attribute. If such a link tag exists, the setOrCreate( ) function sets the href of the link. If such a link tag does not exist, the create( ) function creates the link tag.

In some examples, the JavaScript code explicitly calls the setOrCreate( ) function upon the screen changing. The onload may occur a single time when navigating between screens. In some examples, the change in web page screen causes another "load" event upon navigating to a completely different URL, which prompts execution of the setOrCreateBoomarkIconLink( ) function for a web page of the different URL.

Referring again to the flow chart of FIG. 2, after the web page screen has changed, and after the reference to the bookmark icon in the HTML page has changed, the mobile device may again determine if the web page screen has changed (box 216) (such determination may occur periodically).

In box 218, if the web page screen is determined to not have changed, a determination is made whether the web page has been bookmarked. For example, the mobile device may determine whether a user of the mobile device has selected an interface element or issued a command for causing the mobile device to bookmark a present web page (e.g., a present screen of the web page). If the web page has been bookmarked, the operations of box 222 are performed. If the web page has not been bookmarked, the determination of box 216 is performed. In some examples, the determination whether the page has been bookmarked is performed upon the web browser receiving an event that is issued upon a user bookmarking a web page. The operations of box 218 may be performed by the web browser.

In box 222, the mobile device creates a bookmark. In some examples, the mobile device may generate a display of the bookmark on a desktop display of the mobile device. In some examples, the mobile device may generate a display of the bookmark in a list of bookmarks that can be accessed by selecting a graphical interface element that is displayed by the web browser. The generated bookmark may designate a network address of the web page when the user selects the create bookmark interface element (e.g., when the user selects user interface elements 162 or 164). The designated network address may include a hash fragment.

Creating the bookmark can include retrieving the bookmark icon that is referenced in the representation of the web page (box 224). For example, the mobile device may navigate the DOM to identify a reference in the DOM to a bookmark icon (e.g., a <link> tag that includes a rel attribute that designates a bookmark icon). If such a reference is found, the web browser may retrieve the identified bookmark icon (e.g., by retrieving the bookmark icon over the internet by requesting resources for the href in the <link> tag, or by accessing a bookmark icon that was transmitted with the set of resources 110 and that is stored at the mobile device). If a reference to a bookmark icon is not found in the representation of the web page, the web browser may not determine if a bookmark icon of a predetermined name is stored at a predetermined network address. Instead, the web browser may use a default bookmark icon. In some examples, the bookmark icon is not downloaded or retrieved by the mobile device until the user has requested creation of a bookmark.

In box 226, the mobile device displays the bookmark icon. For example, the mobile device may display the bookmark icon on the mobile device desktop as a visual representation of the bookmark. The mobile device may not display the bookmark icon before the user has requested to create the bookmark.

Figure 3:
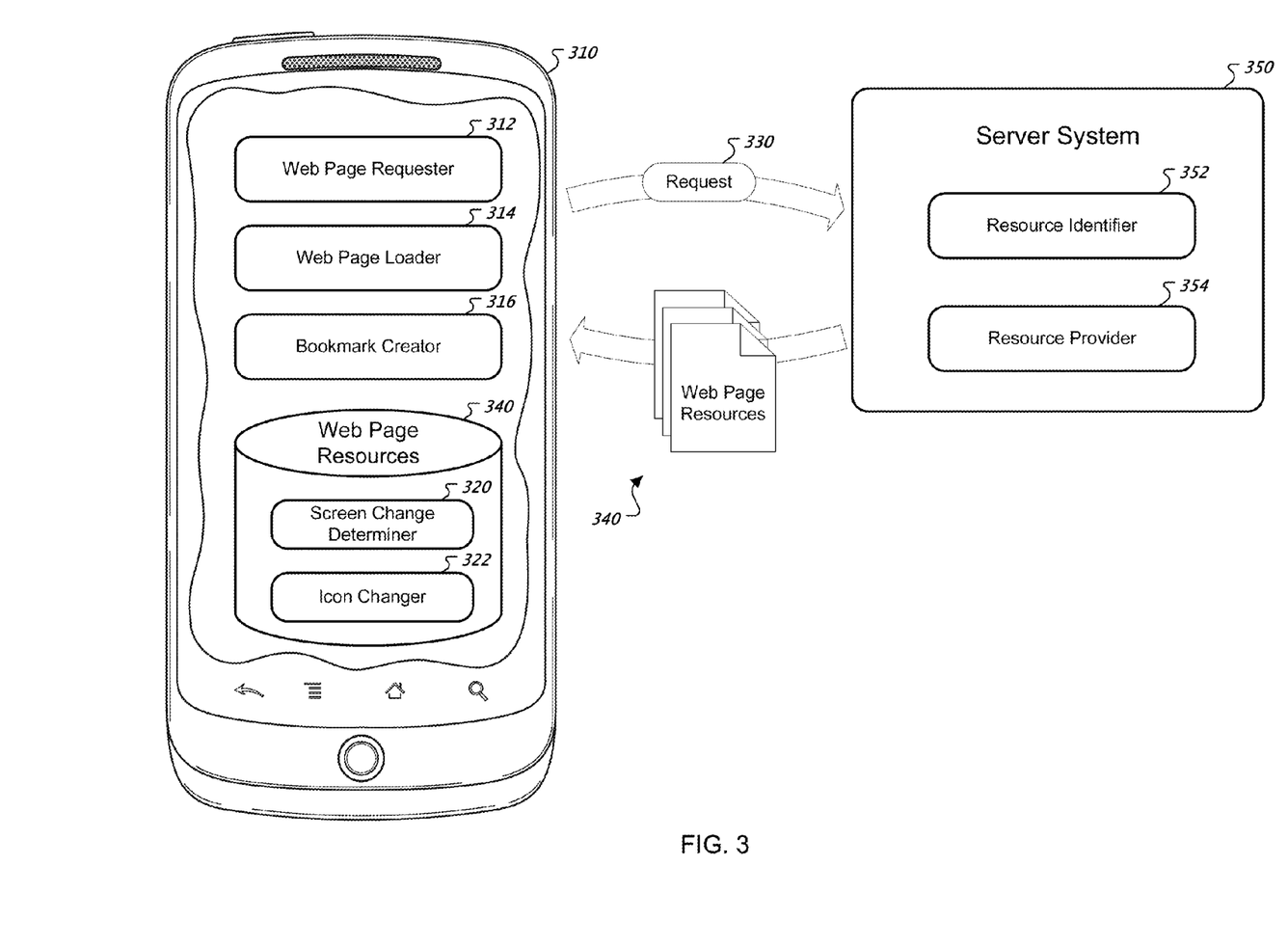
FIG. 3 shows a schematic representation of a system for changing an icon for a web page.

FIG. 3 shows a schematic representation of a system for changing an icon for a web page. The system includes a mobile device 310 that sends a request 330 for a web page to a server system 350. The server system 350 provides the resources 340 to the mobile device 310. The mobile device 310 uses the resources 340 to generate a display of a web page. The mobile device 310 updates, in a representation of the webpage, an indication of a bookmark icon as screens of the web page change so that, when the web page is bookmarked, the web page references an icon that is unique to a presently displayed screen.

In greater detail, the mobile device 310 includes a web page requester 312. The web page requester 312 may be a component of a web browser that receives an indication that the web browser should request a web page, and that requests the web page. For example, the web page requester 312 may generate an HTTP request 330 and provide the request 330 to a network for receipt by the server system 350. In some examples, the web page requester 312 performs the operations of box 202.

The server system may include a resource identifier 352. The resource identifier 352 may receive the request 330, and may identify resources 340 that are responsive to the request. In some examples, the identification includes selecting resources 340 that are associated with the path of a network address that is specified in the HTTP request. In some example, the identification further includes generating resources 340 based on query parameters that were transmitted with the request. In some examples, the resource identifier 352 performs the operations of box 204.

The server system includes a resource provider 354. The resource provider 354 provides the resources 340 to the mobile device 310, for example in an HTTP response. In some examples, the resource provider 354 performs the operations of box 206.

The mobile device 310 includes a web page loader 314. The web page loader 314 may be a component of a web browser that parses the content of the resources 340 while loading the web page. The loading can include generating the DOM for the web page. When the web page loading is complete, the web page loader 314 may generate a "load" event. Scripting code may execute in response to the "load" event. The web page loader 314 can also generate a display of the web page. In some examples, the web page loader 314 performs the operations of box 208.

A screen change determiner 320 and an icon changer 322 can be generated using script code in the received resources 340. The screen change determiner 320 can determine whether a screen of the web page that is displayed by the web page loader 314 has changed. In some examples, the screen change determiner performs the operations of boxes 212 and 216.

The icon changer 322 can change a reference to a bookmark icon, in a representation of the web page, to reference a different bookmark icon. The change may occur in response to the screen change determiner 320 determining that the web page screen has changed. In some examples, the icon changer 322 performs the operations of boxes 214 and 220. In some examples, the web page loader 314 changes the screen that is displayed by the mobile device in response to the screen change determiner 320 determining that the web page screen has changed.

The bookmark creator 316 generates a bookmark using the mobile device 310. For example, the bookmark creator 316 may determine that a user of the mobile device 310 has requested that the mobile device 310 generate a bookmark for a presently displayed web page, and may generate a bookmark using a network address of the presently displayed web page and a bookmark icon that is referenced by the presently displayed web page. In some examples, the bookmark creator 316 performs the operations described in boxes 218 and 222.

Figure 4:
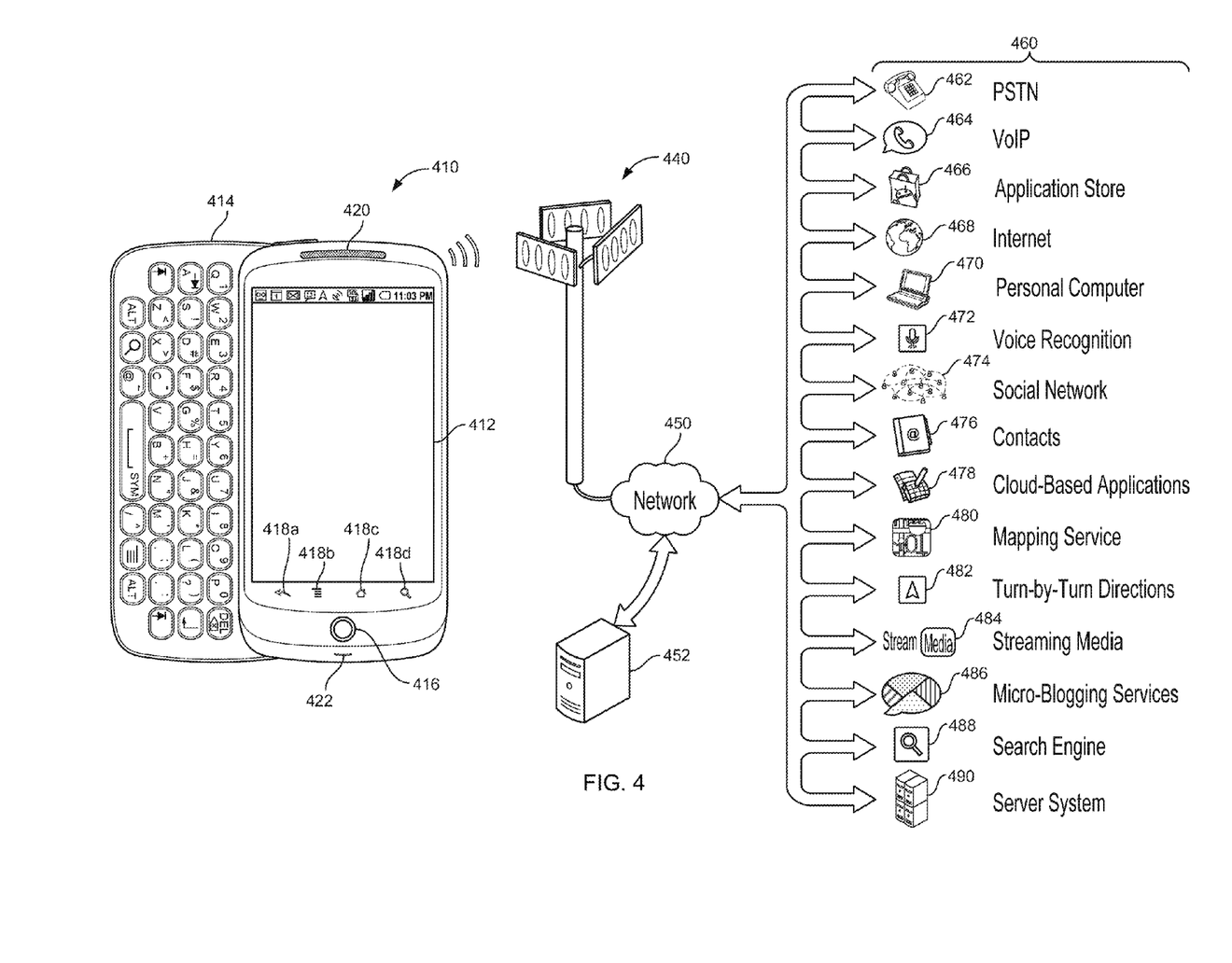
FIG. 4 is a conceptual diagram of a system that may be used to implement the systems and methods described in this document.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or application telephone) that includes a touchscreen display device 412 for presenting content to a user of the mobile computing device 410 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 414, physical buttons, trackballs, accelerometers, gyroscopes, and magnetometers).

Example visual output mechanism in the form of display device 412 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 410. The mobile computing device 410 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 5:
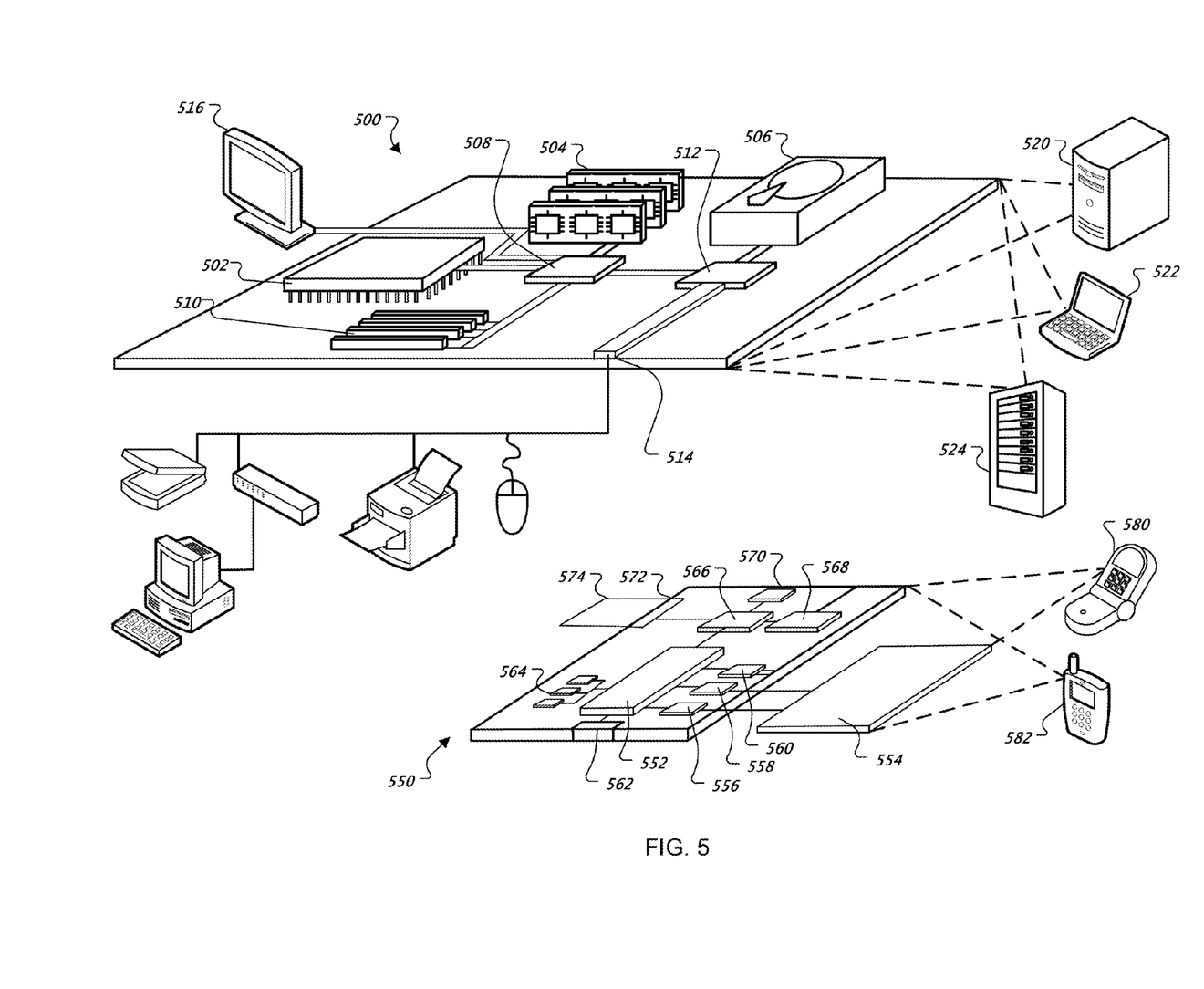
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for changing a reference to a bookmark icon, the method comprising:
    requesting, by a computing device and over a network, resources that correspond to a first network address;
    receiving, by the computing device and from a server system, the resources, wherein the resources include an HTML document and computer program script code, and wherein the HTML document does not include a reference to a bookmark icon;
    processing, by the computing device, the resources to load a web page, including by using the HTML document to create a representation of the HTML document and by using the representation of the HTML document to load the web page;
    determining, by the computing device, that the computing device has loaded the web page and, in response, adding, in the representation of the HTML document, a reference to a first bookmark icon;
    presenting, by the computing device, a display of the web page;
    receiving, by the computing device, a request to change the display of the web page from a first screen of the web page to a second screen of the web page, wherein changing the display of the web page from the first screen to the second screen is performed without the computing device requesting additional resources over the network;
    removing, by the computing device and in response to receiving the request to change the display of the web page from the first screen to the second screen, the reference to the first bookmark icon in the representation of the HTML document, and adding, in response to receiving the request to change the display of the web page from the first screen to the second screen, a reference to a second bookmark icon in the representation of the HTML document; and
    receiving, by the computing device, a user request to bookmark the web page after the reference to the second bookmark icon has been added in the representation of the HTML document, and in response generating a bookmark for the web page that uses the second bookmark icon in a visual appearance of the generated bookmark.

2. The method of claim 1, further comprising, in response to having received the user request to bookmark the web page, (i) identifying, in the representation of the HTML document, the reference to the second bookmark icon, and (ii) identifying an address for the second screen of the web page, wherein the address for the second screen of the web page includes the first network address, wherein the generated bookmark designates the address for the second screen of the web page.

3. The method of claim 2, wherein the computing device does not display the first bookmark icon before the computing device receives the user request to bookmark the web page, and does not display the second bookmark icon before the computing device receives the user request to bookmark the web page.

4. The method of claim 3, further comprising:
displaying, by the computing device and accompanying the display of the first screen, a first website icon, wherein the first website icon is different than the first bookmark icon; and
displaying, by the computing device and accompanying the display of the second screen, a second website icon, wherein the second website icon is different than the second bookmark icon.

5. The method of claim 4, wherein the first website icon is displayed by the computing device in close proximity to an address bar that displays the first network address for the first screen.

6. The method of claim 2, further comprising requesting, by the computing device and over the network, the second bookmark icon in response to the computing device identifying the reference to the second bookmark in the representation of the HTML document.

7. The method of claim 2, wherein the address for the second screen of the web page includes the first network address and a second hash fragment, and wherein an address for the first screen of the web page includes the first network address and a first hash fragment.

8. The method of claim 1, wherein the computer program script code that is received from the server system includes code that causes a web browser at the computing device to perform:
(i) the adding the reference to the first bookmark icon,
(ii) the removing the reference to the first bookmark icon, and
(iii) the adding the reference to the second bookmark icon.

9. The method of claim 1, wherein the reference to the first bookmark icon is included within a "<link>" tag, and wherein the reference to the second bookmark icon is included within a "<link>" tag.

10. The method of claim 9, wherein neither of the first bookmark icon and the second bookmark icon are named any of "apple-touch-icon.png" or "apple-touch-icon-precomposed.png".

11. The method of claim 9, wherein the "<link>" tag includes a rel attribute that specifies that the link tag designates a bookmark icon.

12. The method of claim 11, wherein the rel attribute specifies "apple-touch-icon " as a value.

13. A non-transitory computer-readable storage device storing a computer scripting program, that when executed by a web browser application program that is executing by a processor, performs operations comprising:
adding, after the web browser determines that a web page that is generated using an HTML file has been loaded by the web browser, a reference to a first bookmark icon in a representation of the HTML file, wherein the representation of the HTML file is created from the HTML file and the representation of the HTML file is used to load the web page;
determining that user input, to change a display of the web page from a first screen of the web page to a second screen of the web page without requesting additional resources over a network, has been received;
removing, in response to determining that the user input has been received, the reference in the representation of the HTML file to the first bookmark icon; and
adding, in response to determining that the user input has been received, a reference in the representation of the HTML file to a second bookmark icon.

14. The computer-readable storage device of claim 13, wherein the representation of the HTML file did not include any reference to a bookmark icon before the reference to the first bookmark icon was added in the representation of the HTML file.

15. The computer-readable storage device of claim 13, wherein adding the reference to the second bookmark icon in the representation of the HTML file includes overwriting the reference to the first bookmark icon in the representation of the HTML file.

16. The computer-readable storage device of claim 13, wherein determining that user input to change the display of the web page from the first screen to the second screen has been received includes periodically determining whether a network address of the web page has changed.

17. The computer-readable storage device of claim 16, wherein the determining whether the network address of the web page has changed includes determining that a hash fragment in the network address of the web page has changed.

18. The computer-readable storage device of claim 13, further comprising, in response to determining that the user input to change the display of the web page from the first screen to the second screen has been received, changing the display of the web page from the first screen to the second screen.

19. The computer-readable storage device of claim 18, further comprising, in response to determining that the user input to change the display of the web page from the first screen to the second screen has been received, changing content of a network address of the web page by changing a hash fragment portion of the network address and not changing a remaining portion of the network address.

20. A computer-implemented method, comprising:
adding, after a web browser determines that a web page that is generated using an HTML file has been loaded by the web browser, a reference to a first bookmark icon in a representation of the HTML file, wherein the representation of the HTML file is created from the HTML file and the representation of the HTML file is used to load the web page;
determining that user input, to change a display of the web page from a first screen of the web page to a second screen of the web page without requesting additional resources over a network, has been received;
removing, in response to determining that the user input has been received, the reference in the representation of the HTML file to the first bookmark icon; and
adding, in response to determining that the user input has been received, a reference in the representation of the HTML file to a second bookmark icon.

* * * * *